(12) United States Patent
Woldeamanuel et al.

(10) Patent No.: US 12,517,029 B2
(45) Date of Patent: Jan. 6, 2026

(54) SYSTEMS AND METHODS FOR IDENTIFYING SECONDARY POROSITY

(71) Applicant: SAUDI ARABIAN OIL COMPANY, Dhahran (SA)

(72) Inventors: Mandefro Belayneh Woldeamanuel, Dhahran (SA); Mohammed Aljasem, Dhahran (SA); Paul Tarabbia, Dhahran (SA); Tomislav Ilijas, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 407 days.

(21) Appl. No.: 18/172,870

(22) Filed: Feb. 22, 2023

(65) Prior Publication Data
US 2024/0280461 A1 Aug. 22, 2024

(51) Int. Cl.
| | |
|---|---|
| *G01N 15/08* | (2006.01) |
| *G01N 23/046* | (2018.01) |
| *G01N 23/083* | (2018.01) |
| *G01N 33/24* | (2006.01) |

(52) U.S. Cl.
CPC ........... *G01N 15/08* (2013.01); *G01N 23/046* (2013.01); *G01N 23/083* (2013.01); *G01N 33/24* (2013.01); *G01N 2015/0846* (2013.01); *G01N 2223/616* (2013.01)

(58) Field of Classification Search
None
See application file for complete search history.

(56) References Cited

U.S. PATENT DOCUMENTS

| | | | |
|---|---|---|---|
| 5,809,163 | A | 9/1998 | Delhomme et al. |
| 7,133,777 | B2 | 11/2006 | Goswami et al. |
| 9,977,996 | B2 | 5/2018 | Yamada et al. |
| 2007/0061079 | A1* | 3/2007 | Hu .......................... E21B 25/00 702/6 |
| 2015/0234069 | A1 | 8/2015 | Ramakrishnan et al. |
| 2016/0155021 | A1* | 6/2016 | Yamada .................. G01V 1/306 382/109 |
| 2022/0170366 | A1* | 6/2022 | Ou ........................ E21B 49/005 |

FOREIGN PATENT DOCUMENTS

CN 114429483 A 5/2022

OTHER PUBLICATIONS

Pal, A., et al. "Porosity estimation by digital image analysis." ONGC Bulletin 53.2 (2018): 59. (Year: 2018).*
Tyagi, A.K. & Bhaduri, A. 2002. Porosity analysis using borehole electrical images in carbonate reservoirs. SPWLA 43rd Annual Logging Symposium.

(Continued)

*Primary Examiner* — Matthew G Marini
(74) *Attorney, Agent, or Firm* — Vorys, Sater, Seymour and Pease LLP

(57) ABSTRACT

In some examples, a method for identifying secondary porosities can include correlating multiple sets of data of a subsurface formation, identifying one or more secondary porosities based on the correlated data, and determining a volumetric estimation of the subsurface formation based on the one or more secondary porosities. The multiple sets of data are selected from one or more of core sample images, borehole images, caliper enlargement data, bad-hole flag data, and loss circulation data.

18 Claims, 5 Drawing Sheets

(56) References Cited

OTHER PUBLICATIONS

Araujo, R. E. et al. 2020. Structural and sedimentary discontinuities control on formation of karst dissolution cavities: example from the Potiguar Basin, Brazil. 4th Naturally Fractured Reservoir Workshop, Feb. 11-13, 2020, UAE.

Safko, Paul S., and John J. Hickey. A Preliminary Approach to the Use of Borehole Data, Including Television Surveys, for Characterizing Secondary Porosity of Carbonate Rocks in the Floridan Aquifer System. Tallahassee, Fla: U.S. Dept. of the Interior, U.S. Geological Survey, 1992.

Pal, Arnab & Garia, Siddharth & Karangat, Ravi & Nair, Archana. (2018). Porosity Estimation by Digital Image Analysis. 53. 59-72.

* cited by examiner

SYSTEMS AND METHODS FOR IDENTIFYING SECONDARY POROSITY

FIELD OF THE DISCLOSURE

This disclosure relates generally to identifying secondary porosity in subsurface formations, and more particularly, to systems and methods for digitally identifying secondary porosity using subsurface images and data.

BACKGROUND OF THE DISCLOSURE

In the oil and gas industry, field development can depend upon estimates of reservoir volume as well as predictions of loss circulation intervals. Porosity, which is a ratio of void space to total volume, determines a storage capacity of a reservoir. Secondary porosity is additional porosity that results from geological processes that occur after deposition (e.g., during dissolution and re-precipitation) of a sediment, or matrix, and can impact the volumetric estimates for a reservoir. Secondary porosities may also be referred to as dissolution porosities or non-matrix porosities. Porosity types may form during sedimentation, diagenesis, or deformation. Porosity types in carbonates include micro-porosity, meso-porosity, macro-porosity, mega-porosity, and fracture porosity. Micro-porosity includes inter-particle porosity (e.g., porosity between particles) and intra-particle porosity (e.g., porosity within individual particles or grains), which can measure under 1 millimeter (mm). Meso-porosity includes moldic porosity (e.g., porosity formed by removal of a constituent of a rock) and vugs, or cavities, which can measure under a few centimeters (cm). Macro-porosity includes porosity formed due to enlargement of smaller porosities, interconnection of vugs or molds via fractures or other zones of weakness, or a combination thereof, and which can measure between a few cm to a few inches (in). Mega-porosity includes porosities formed by karstification or cave formation, which can be expressed as sinkholes, collapsed structures, networks of channels, or a combination thereof, and which can measure between a few inches to tens of feet (ft). Fracture porosity includes porosities formed by natural fracturing, or cracking, within the matrix. Variability in size, shape, orientation, origins, or a combination thereof, of secondary porosities leads to difficulties in identification of the secondary porosities as well as quantification of the secondary porosities.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method for identifying secondary porosities can include correlating multiple sets of data of a subsurface formation, identifying one or more secondary porosities based on the correlated data, and determining a volumetric estimation of the subsurface formation based on the one or more secondary porosities. The multiple sets of data are selected from one or more of core sample images, borehole images, caliper enlargement data, bad-hole flag data, and loss circulation data.

In another embodiment consistent with the present disclosure, a non-transitory, computer-readable medium storing machine-readable instructions, which, when executed by a processor, cause the processor to determine that images associated with a subsurface formation pass quality control; correlate multiple sets of data of the subsurface formation with the quality-controlled images; identify one or more secondary porosities based on the data; and determine a volumetric estimation of the subsurface formation based on the one or more secondary porosities. The multiple sets of data are selected from one or more of caliper enlargement data, bad-hole flag data, and loss circulation data.

According to another embodiment consistent with the present disclosure, a system can include a quality control module, implemented by at least one processor, to determine whether images enable a secondary porosity analysis of a subsurface formation, and a secondary porosity module, implemented by the at least one processor, to determine a volumetric estimate of the subsurface formation based on the quality-controlled images and multiple sets of data selected from one or more of caliper enlargement data, bad-hole flag data, and loss circulation data.

Any combinations of the various embodiments and implementations disclosed herein can be used in a further embodiment, consistent with the disclosure. These and other aspects and features are better appreciated according to the following description of certain embodiments presented herein in accordance with the disclosure and the accompanying drawings and claims.

DETAILED DESCRIPTION

Embodiments of the present disclosure will now be described in detail with reference to the accompanying Figures. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to identifying secondary porosity in subsurface formations, and more particularly, to systems and methods for digitally identifying secondary porosity using subsurface images and data. The subsurface data includes data associated with a well or a borehole drilled into a subsurface formation and includes core sample data. As described above, secondary porosities can impact the volumetric estimates and field development of a reservoir, but variability in size, shape, origins, or a combination thereof, of the secondary porosities leads to difficulties in identification and quantification of the secondary porosities within a subterranean formation of the reservoir. Examples are described herein in which systems and methods are used for identifying secondary porosities using multiple sets of data associated with a subsurface formation. The multiple sets of data are selected from one or more of core sample images, borehole images, caliper enlargement, bad-hole flags, and partial or complete loss circulations in the well. Partial or complete loss circulations are herein collectively referred to as loss circulations. Identifying secondary porosities in a subsurface formation improves volumetric estimates and loss circulation predictions for a reservoir of the subsurface formation. Improving loss circulation predictions assists in identification of hazardous zones during drilling and field development. Additionally, the systems and methods can be used in other industries outside of oil and gas, for example, in the mining industry, the quarry industry, the hydrological industry, or like industries in which drilling or quarrying of subterranean formations can be performed. Thus, the systems and methods as described herein can be used in any environment or industry to improve identification of secondary porosities.

Figure 1:
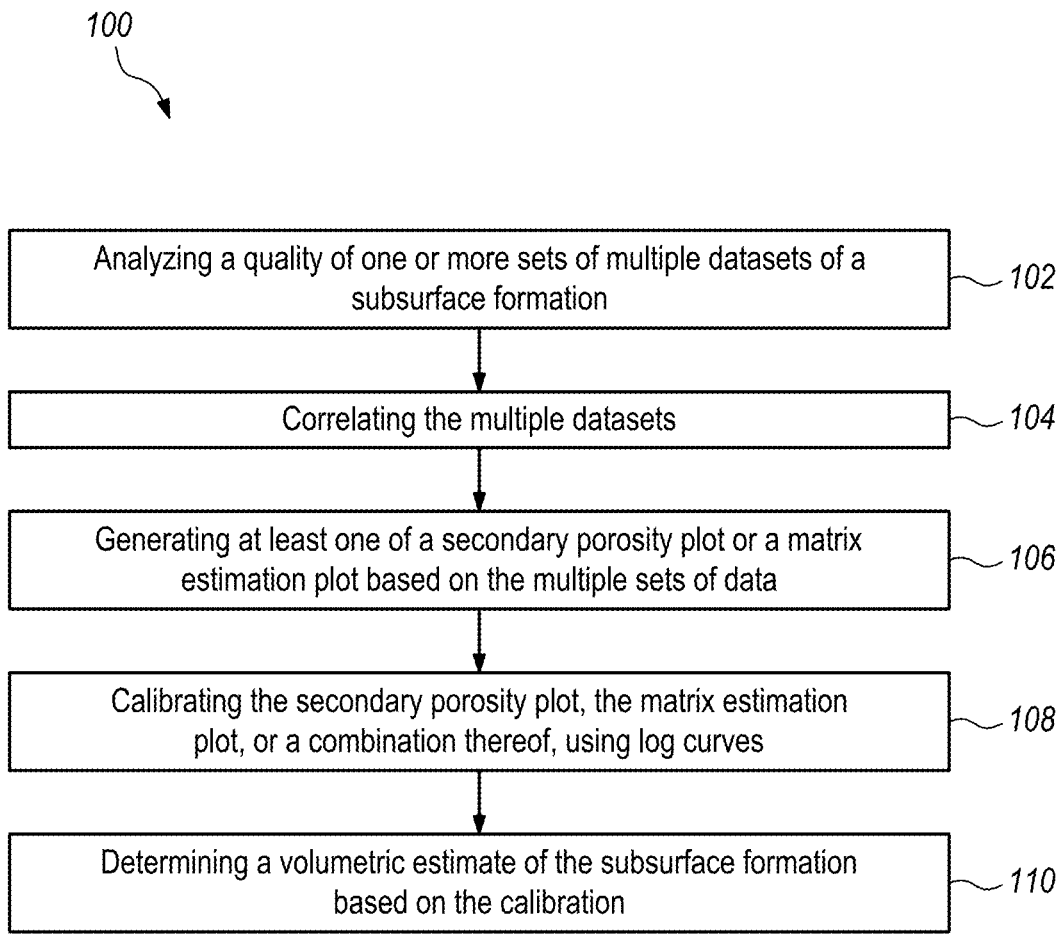
FIG. 1 is a flowchart of a method for identifying secondary porosities, in accordance with certain embodiments.

FIG. 1 is a flowchart of a method 100 for identifying secondary porosities, in accordance with certain embodiments. The method 100 can be at least partially implemented by a system, such as a system 400 shown in FIG. 4 or a computer system 500 shown in FIG. 5, and may allow data associated with a subsurface formation to be translated into a subsurface model that identifies and quantifies secondary porosities of the subsurface formation. The method 100 includes analyzing a quality of data associated with a subsurface formation (102), correlating the data (104), generating a secondary porosity plot or a matrix estimation plot based on the data (106), calibrating the secondary porosity plot or the matrix estimation plot using log curves (108), and determining a volumetric estimate of the subsurface formation based on the calibration (110).

In a non-limiting example, the method 100 starts with receiving data associated with the subsurface formation. The data includes multiple sets of data collected by drilling or logging tools used for exploring the subsurface formation. The multiple sets of data may be selected from one or more of core sample images, borehole images, caliper enlargement data, bad-hole flag data, loss circulation data, or other logging data collected by the drilling or logging tools. Images of core samples may include one or more 360° views, one or more slabbed views, or a combination thereof, of one or more core samples of the subsurface formation. The one or more core samples may be core samples collected from different locations within an area of the subsurface formation for which a volumetric estimation is to be made. The borehole images are images generated using logging and data-processing techniques within a borehole. The logging techniques may use one or more of electrical imaging (e.g., electrical resistivity imaging (ERI), electrical resistivity tomography (ERT)), optical imaging (e.g., computed tomography (CT) scans), acoustic imaging (e.g., ultrasonic), or other technique for capturing images within a borehole. Borehole images may include one or more 360° views, one or more partial views, or a combination thereof, of one or more boreholes of the subsurface formation. The one or more boreholes may be drilled at different locations within an area of the subsurface formation for which a volumetric estimation is to be made. The one or more boreholes may be at a same or at a different location than a location of a core sample. The caliper enlargement data includes diameters at different depths of the one or more boreholes. The caliper enlargement data may be measurements received from a caliper tool included in a drilling tool string that is used for drilling into the subsurface formation. The caliper tool uses a specified caliper size appropriate for the project and measures deviations that may result from drilling through a non-matrix pore system. The caliper size may be specified by an owner/operator of the caliper tool, the drilling tool string, or an exploration operation or job associated with the subsurface formation, for example. The bad-hole flag data includes one or more depths for which a determination is made that the one or more boreholes has unstable wellbore walls. The bad-hole flag data may be measurements received from one or more tools of the drilling tool string during drilling operations. The one or more tools of the drilling tool string may analyze the wellbore shape and determines whether one or more sections of the wellbore deviates from having a roughly circular outline, or other-shaped outline associated with a drill bit of the drilling equipment. In response to the one or more sections deviating from having the roughly circular or other-shaped outline, the one or more sections are associated with a bad-hole flag. The loss circulation data includes data measurements of drilling mud (e.g., volumetric flow, density downhole). The data measurements are used to determine whether drilling mud is partially or completely lost during drilling of the one or more boreholes. The loss circulation data may be measurements received from a flowmeter or temperature log, for example. Receiving the data may include receiving the data from an input device, retrieving the data from a computer-readable medium, or a combination thereof. The multiple sets of data are received from a computer-readable medium of one or more logging tools, a computer-readable medium storing one or more sets of data remotely, or a combination thereof, for example.

The method 100 may also include analyzing a quality of the one or more core sample images, the one or more borehole images, or a combination thereof, to determine whether the images associated with the subsurface formation pass quality control, in another non-limiting example. In response to the quality of the core sample images, the borehole images, or the combination thereof, being below a threshold level, the method 100 may include one or more of notifying a user to provide one or more replacement images in response to the quality. The threshold level may be a specified lower end of resolution, for example. In a non-limiting example, the method 100 includes receiving the one or more replacement images and analyzing the quality of the one or more replacement images. The method 100 also includes, in a non-limiting example, replacing the core sample images, the borehole images, or the combination thereof, with the one or more respective replacement images. In another non-limiting example, in response to a quality of one or more of the core sample images, the borehole images, or the combination thereof, being below a threshold level, the method 100 may include performing one or more image processing techniques on the one or more of the core sample images, the borehole images, or the combination thereof, having the quality below the threshold level. The one or more image processing techniques may include adjusting one or more properties of an image, restoring one or more missing pixels, combining one or more images, or other technique for adjusting visibility of objects depicted by an image. The one or more properties may include a dimension, a resolution, a color space, a contrast, a brightness, a sharpness, or other attribute that impacts an ability to identify objects depicted by an image. A first set of image processing techniques may be used to improve a first set of images and a second set of image processing techniques may be used to improve a second set of images. The one or more image processing techniques may be used to enhance or emphasize different geological features of the one or more borehole images, the one or more core sample images, or the combination thereof, for example.

In a non-limiting example, the method 100 includes correlating one or more of the caliper enlargement data, the bad-hole flag data, or the loss circulation data with the quality-controlled images. The method 100 may include determining a baseline to use for correlating the core sample image, the borehole images, the caliper enlargement data, the bad-hole flag data, and the loss circulation data, for example. The baseline may be a specified starting depth at which to compare the multiple sets of data, for example. In some examples, the method 100 includes determining whether bad-hole flags, caliper enlargements, or loss circulations are contributed to geological features in the subsurface formation and not induced by drilling activities after correlating the data. For example, caliper enlargements may be caused by breakouts and wellbore collapses, both of which are not related to secondary porosity detection and quantification as breakouts and wellbore collapses occur due to low mud weight during drilling. In another example, loss circulations can occur by intersecting a fracture along the wellbore or using excessive mud weight, both of which may cause the formation to form a break, or crack. By correlating the data, plots associated with the caliper enlargement data, the bad-hole flag data, the loss circulation data, or a combination thereof, may be compared to identify fractures, breakouts, wellbore collapses, or a combination thereof. The method 100 may include flagging, or marking with a specified indicator or the like, one or more segments of the bad-hole flag data, caliper enlargement data, loss circulation data as induced by human activity. A segment, as used herein, is a specified depth range of a plot. The method 100 may include converting the correlated data, the flagged data, or a combination thereof, to plots such as shown herein by FIG. 2. Additionally, the method 100 includes displaying one or more of the plots. The one or more plots may be herein referred to as log curves.

The method 100 may generate one or more image arrays using the one or more core sample images, the one or more borehole images, or a combination thereof, in a non-limiting example. The one or more core sample images, the one or more borehole images, or the combination thereof, may include one or more static images, dynamic images, or a combination thereof. The one or more core sample images, the one or more borehole images, or the combination thereof, may also include one or more processed core sample images, one or more processed borehole images, or a combination thereof. For example, if the analysis of the image quality of a core sample image or a borehole image indicates that the image is unacceptable (e.g., one or more of a dimension is outside a specified dimension tolerance, a color space is different than a specified color space, a contrast is outside a specified contrast tolerance, a brightness is outside a specified brightness tolerance, a sharpness is outside a specified sharpness tolerance, a resolution is outside a specified resolution tolerance), the method 100 includes using the one or more image processing techniques on the core sample image or the borehole image to improve the image quality (e.g., one or more of adjusting the dimension to be within the specified dimension tolerance, adjusting the color space to the specified color space, adjusting the contrast be within the specified contrast tolerance, adjusting the brightness to be within the specified brightness tolerance, adjusting the sharpness to be within the specified sharpness tolerance, adjusting the resolution be within the specified dimension tolerance). The specified dimension tolerance, the specified color space, the specified contrast tolerance, the specified brightness tolerance, the specified sharpness tolerance, the specified resolution tolerance, or a combination thereof, may be determined by a user of the method 100. For example, the user may use a graphical user interface to set a resolution of the image equivalent to 300 pixels per inch (ppi) or greater with a tolerance of a specified percentage (e.g., 1%, 2.5%, 5%, 10%). The method 100 may include using a point counting technique or other technique for estimating a composition of rocks depicted by the one or more image arrays to identify areas of the subsurface formation including secondary porosities or the matrix. The method 100 may include flagging, or marking with a specified indicator or the like, one or more segments of the one or more image arrays as secondary porosities or the matrix. The method 100 may include converting the one or more image arrays, the flagged data indicating secondary porosities, the flagged data indicating the matrix, or a combination thereof, to plots such as shown herein by FIG. 2. Additionally, the method 100 includes displaying one or more of the plots.

In a non-limiting example, includes comparing one or more log curves to the secondary porosity plot, the matrix estimation plot, or a combination thereof, to calibrate the secondary porosity plot, the matrix estimation plot, or the combination thereof. For example, the method 100 may include determining that a segment of the secondary porosity plot is not a secondary porosity based on comparison to an associated segment of one or more of a bad-hole flag plot, a caliper enlargement plot, or a loss circulation plot. The method 100 may also include modifying the secondary porosity plot to include an indication that the segment is not a secondary porosity. In a non-limiting example, the method 100 may include using CT scans of the one or more core samples to collect measurements when the one or more core samples are saturated with one or more fluids. The method 100 may include determining a saturation of each of the one or more fluids based on the measurements. The method 100 may include calibrating the secondary porosity plot, the matrix estimation plot, or the combination thereof, using a plot of the saturation of each of the one or more fluids.

The method 100 includes determining an interval of the secondary porosity plot, the matrix estimation plot, or the combination thereof. The interval is a vertical window used in determining the volumetric estimate. The interval may be based on a type of logging tool used to generate the one or more borehole images. For example, in response to a wellbore formation micro-imager (FMI) tool generating the one or more borehole images, the interval is equivalent to a vertical resolution of the borehole image. The method 100 includes determining a volumetric estimate for each interval of the secondary porosity plot, the matrix estimation plot, or the combination thereof. Additionally, the method 100 includes summing the volumetric estimates for each interval. The method 100 includes determining a volumetric estimate of the secondary porosities of the subsurface formation using the following equation:

$$\text{Secondary Porosity } (\emptyset_s) = \frac{\sum \text{Volume of Voids}}{\text{Gross Volume of the rock}}.$$

While, for purposes of simplicity of explanation, the method 100 of FIG. 1 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the method.

In some examples, the method 100 can generate an output characterizing the reservoir. The output can then be rendered on a display device (e.g., a display device as described with respect to FIG. 5), and thus enable a user (e.g., a technician) to visualize one or more results of the method 100. In some examples, the output can be stored in a computer-readable medium (e.g., a computer-readable medium 404 as described with respect to FIG. 4, a computer-readable medium as described with respect to FIG. 5). The computer-readable medium may be a computer-readable medium of the cloud, which enables remote access, for example.

Figure 2:
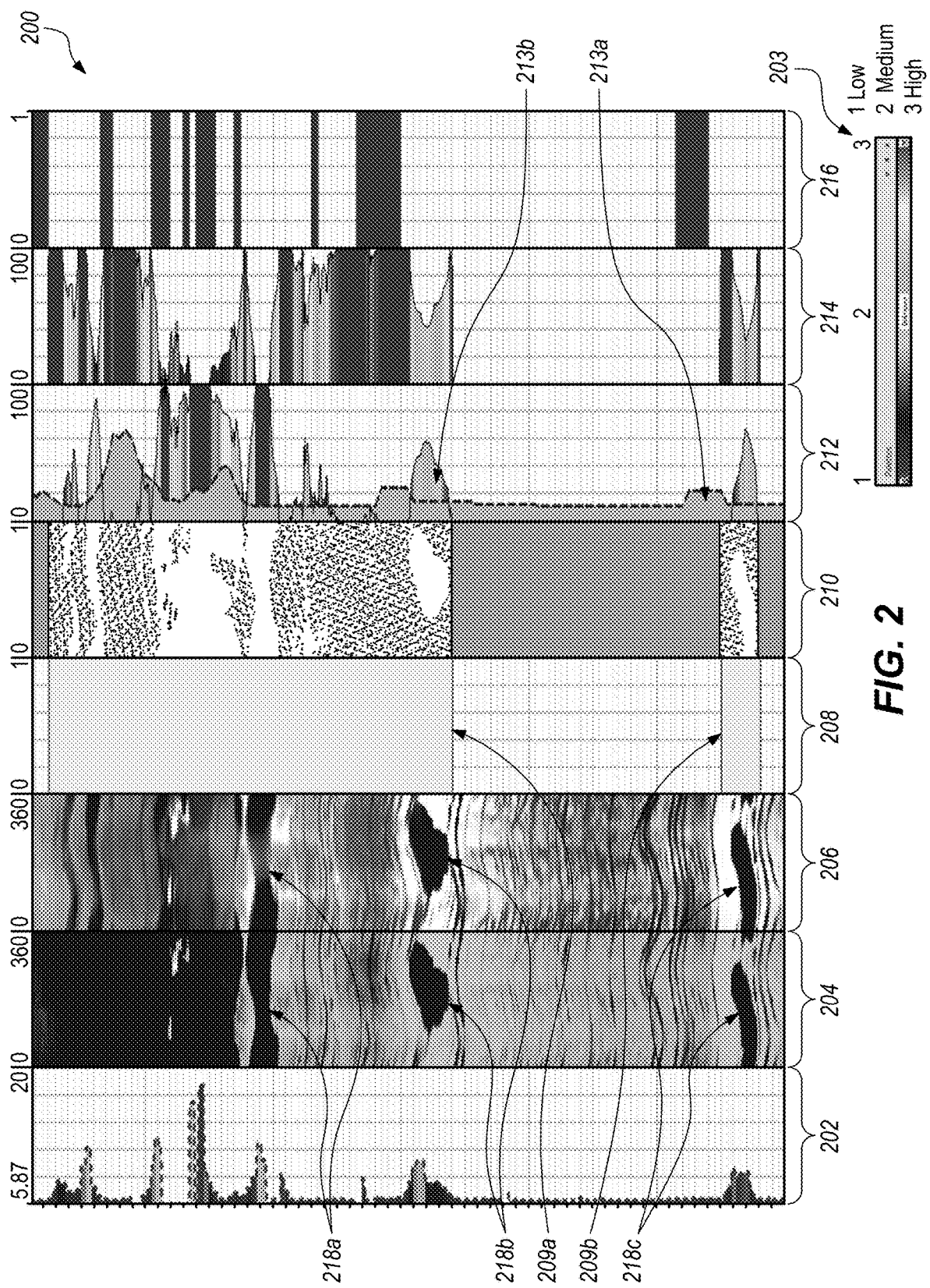
FIG. 2 is an example output of a method or a system for identifying secondary porosities, in accordance with certain embodiments.

FIG. 2 is an example of an output 200 of a method or a system for identifying secondary porosities, in accordance with certain embodiments. The output 200 may be an output of the method 100 of FIG. 1, a method 300 of FIG. 3, the system 400 of FIG. 4, or the computer system 500 of FIG. 5, for example. The output 200 includes multiple plots and images used by the method or the system for identifying secondary porosities. The output 200 includes a caliper enlargement plot 202, an intensity scale 203, a static image 204, a dynamic image 206, a secondary porosity flag plot 208, a secondary porosity quantification plot 210, a comparison plot 212, a matrix estimation plot 214, and a bad-hole flag plot 216.

The caliper enlargement plot 202 illustrates a borehole having diameters that vary between 5.87 and 20 inches. In a non-limiting example, the caliper enlargement plot 202 is a plot of the caliper enlargement data. The static image 204 illustrates a 360° static view of the borehole. In a non-limiting example, the static image 204 includes multiple images processed to provide the 360° for a total depth of the borehole. The multiple images include one or more core sample images, one or more borehole images, or a combination thereof. The dynamic image 206 illustrates a 360° dynamic view of the borehole. In a non-limiting example, a specified parameter is applied to the static image 204 to generate the dynamic image 206. The specified parameter is an image processing parameter based on, in part, a type of logging tool used to generate the borehole image. In another non-limiting example, multiple specified parameters are applied to the static image 204 to enhance a quality of the dynamic image 206. For example, each specified parameter of the multiple specified parameters may be associated with a different property of an image to enable different image processing techniques.

The secondary porosity flag plot 208 illustrates segments 209a, 209b, of the subsurface formation that may include secondary porosities, as indicated by the solid blocks. In a non-limiting example, the secondary porosity flag plot 208 is determined by identifying segments of one or more of the caliper enlargement plot 202, the static image 204, the dynamic image 206, or a combination thereof, having indicators of secondary porosities. For example, in response to one or more of (1) a determination that the static image 204, the dynamic image 206, or the combination thereof, has an intensity below a specified value for a depth, (2) a determination that a value of the caliper enlargement data exceeds a specified threshold at the specified depth, or (3) a like indicator that a void, or cavity, exists within the subterranean formation, the value of the secondary porosity flag plot 208 for the corresponding segment is set as one. The specified value, the specified threshold, or a combination thereof, is adjustable by a user of the system or method that generates the output 200, in a non-limiting example. For example, in response to a determination that a void within a specified segment is caused by human activity, the user may adjust the value of the secondary porosity flag plot 208 for the specified segment to zero.

The secondary porosity quantification plot 210 shows areas of the subsurface formation that may include meso-, macro-, or mega-porosities. In a non-limiting example, the secondary porosity quantification plot 210 is determined by identifying areas of the dynamic image 206 that correspond to the segments 209a, 209b of the secondary porosity flag plot 208 and having indicators of matrix. For example, in response to one or more of (1) a determination that the static image 204, the dynamic image 206, or the combination thereof, within the segments 209a, 209b have an intensity equivalent to or above a specified value, (2) a determination that a value of the caliper enlargement data is equivalent to or below a specified threshold, (3) a determination that the bad-hole flag plot 216 indicates a bad-hole flag for an area, or a combination thereof, an intensity of the secondary porosity quantification plot 210 for the corresponding areas is set to a second intensity (e.g., the gradient areas) that is different than an intensity of an area that indicates secondary porosities (e.g., the light gray areas). In a non-limiting example, the areas having the second intensity are attributable to matrix or micro-porosities. The bad-hole flag plot 216 illustrates different areas, as illustrated by solid blocks, associated with bad-hole flag data of the borehole acquired while drilling the wellbore. In a non-limiting example, the bad-hole flag plot 216 is compared to areas of one or more of the caliper enlargement plot 202, the static image 204, the dynamic image 206, or a combination thereof, having indicators of secondary porosities. In response to the one or more comparisons indicating that the bad-hole flag data is valid, the value of the bad-hole flag plot 216 for the corresponding area is set as one.

The comparison plot 212 illustrates a matrix and microporosity, as indicated by the area within boundaries of the dotted line (e.g., 213a), and secondary porosities, as indicated by the area outside the boundaries of the dotted line (e.g., 213b) as percentages of a total porosity of the reservoir. In a non-limiting example, the matrix and microporosity are determined based on conventional log curves (e.g., curves from measurements of one or more of electrical, acoustic, radioactive, electromagnetic, or other geological properties of the matrix). In a non-limiting example, an intensity of the secondary porosities indicates a percentage of the total porosity of the reservoir. For example, an area of the secondary porosities having an intensity around the intensities around the 1 on the intensity scale 203 contributes a lower percentage of the total porosity than an area of the secondary porosities having an intensity equivalent to the intensities around the 2 or 3 on the intensity scale 203, and an area of the secondary porosities having an intensity around the intensities around the 2 on the intensity scale 203 contributes a lower percentage of the total porosity than an area of the secondary porosities having an intensity equivalent to the intensities around the 3 on the intensity scale 203.

The matrix estimation plot 214 illustrates a volumetric estimate of the matrix and micro-porosity as percentages of a total porosity of the reservoir. In a non-limiting example, an intensity of the matrix and micro-porosities indicates a percentage of the total porosity of the reservoir. For example, an area of the matrix and micro-porosities having an intensity around the intensities around the 1 on the intensity scale 203 contributes a lower percentage of the total porosity than an area of the matrix and micro-porosities having an intensity equivalent to the intensities around the 2 or 3 on the intensity scale 203, and an area of the matrix and micro-porosities having an intensity around the intensities around the 2 on the intensity scale 203 contributes a lower percentage of the total porosity than an area of the matrix and micro-porosities having an intensity equivalent to the intensities around the 3 on the intensity scale 203.

In a non-limiting example, the output 200 includes three areas of interest, an area 218a, an area 218b, and an area 218c. The areas 218a, 218b, 218c may indicate secondary porosities. A type of the secondary porosity for each area of the areas of interest may be determined by plotting an output from each interval on a histogram showing frequency versus percentage. A percentage that is less than 50% indicates a meso-porosity. A percentage that is between 50% and 80% (e.g., equivalent to or greater than 50% and equivalent to or less than 80%) indicates a macro-porosity. A percentage that is greater than 80% indicates a mega-porosity. For example, the area 218a may be a tabular-shaped mega-pore, the area 218b may be an irregular-shaped macro-pore, and the area 218c may be a lenticular-shaped macro-porosity. Volumes of the areas 218a, 218b and 218c may be added to a volume attributed to the matrix to improve the estimate of the reservoir volume.

In some applications, the subsurface formation can form part of an oil or gas infrastructure. For example, the subsurface formation can correspond to different sections within an upstream sector. The upstream sector (also known as exploration and production) covers exploration, recovery, and production of crude oil and natural gas. Examples are presented herein in which the output 200 is used for improving volumetric estimates and identification of drilling hazards within a reservoir of the subsurface formation to facilitate recovery and production in the upstream sector. However, in other examples, the output 200 can be used in other industries.

Figure 3:
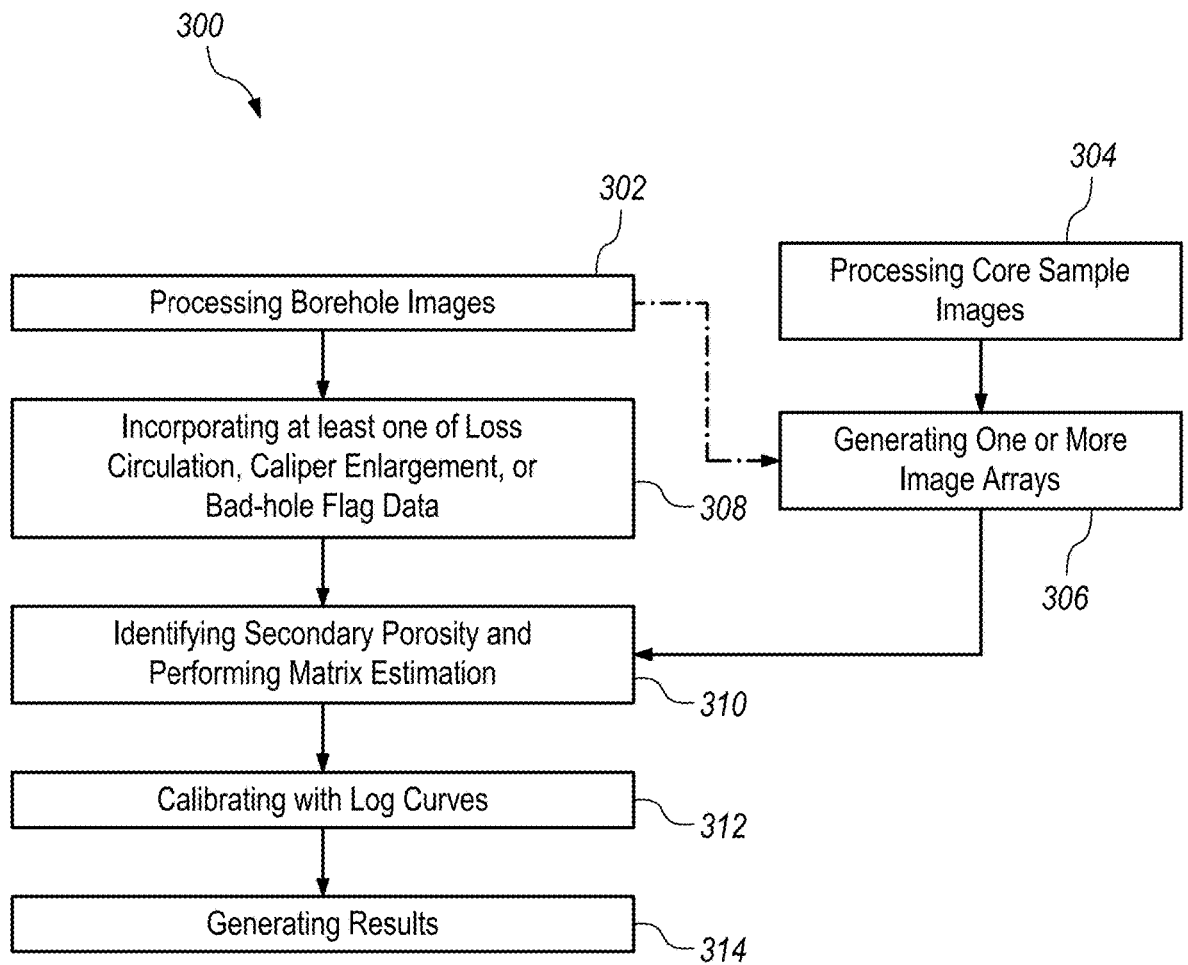
FIG. 3 is a flowchart of a method for identifying secondary porosities, in accordance with certain embodiments.

In view of the foregoing structural and functional features described herein, an example method will be better appreciated with reference to FIG. 3. While, for purposes of simplicity of explanation, the method of FIG. 3 is described as shown, it is to be understood and appreciated that the present examples are not limited by the illustrated order, as some actions could in other examples occur in different orders, multiple times and/or concurrently from that shown and described herein. Moreover, it is not necessary that all described actions be performed to implement the method.

FIG. 3 is an example of a method 300 for identifying secondary porosities, in accordance with certain embodiments. The method 300 can be at least partially implemented by a system, such as the system 400 shown in FIG. 4 or the computer system shown in FIG. 5, for example. The method 300 includes processing borehole images (302), processing core sample images (304), generating image arrays (306), incorporating one or more of loss circulation data, caliper enlargement data, or bad-hole flag data (308), identifying secondary porosity and performing matrix estimation (310), calibrating with log curves (312), and generating results (314).

In a non-limiting example, the method 300 starts in response to receiving a request from a user, the present system, another system, or a combination thereof, that indicates the present system is to perform the method 300. Receiving the request includes, but is not limited to receiving a signal received from one or more input devices, network interfaces, or a combination thereof, associated with the present system, another system, or a combination thereof, for example. The signal includes data of a subsurface formation, for example.

In a non-limiting example, processing the borehole images (302), processing the core sample images (304), or a combination thereof, includes using one or more image processing techniques to improve a quality of one or more of the borehole images, one or more of the core sample images, or a combination thereof. The one or more image processing techniques may be the one or more image processing techniques described herein with respect to FIG. 1 or 2, for example. The one or more image processing techniques may be used to enhance or emphasize different geological features of the one or more borehole images, the one or more core sample images, or the combination thereof, where the different geological features may be indicative of secondary porosities, for example.

In a non-limiting example, generating the one or more image arrays (306) uses techniques as described herein with respect to FIG. 1 or 2. An output of generating the one or more image arrays (306) may be one or more images. The one or more images may be a static image (e.g., the static image 204), a dynamic image (e.g., the dynamic image 206), or a combination thereof. In a non-limiting example, to incorporate the at least one of the loss circulation data, the caliper enlargement data, or the bad-hole flag data (308), the method 300 includes performing quality control on the at least one of the loss circulation data, the caliper enlargement data, or the bad-hole flag data. The method 300 uses techniques of determining whether the loss circulation data, the caliper enlargement data, or the bad-hole flag data includes indications of inducement by human activity as described herein with respect to FIG. 1 or 2 to perform the quality control, for example. In a non-limiting example, an out of incorporating the at least one of the loss circulation data, the caliper enlargement data, or the bad-hole flag data (308) includes one or more plots. For example, the method 300 may generate one or more of the caliper enlargement plot 202 of FIG. 2, the bad-hole flag plot 216 of FIG. 2.

To identify the secondary porosity and perform matrix estimation, the method 300 also includes detection, characterization, and classifying secondary porosity into meso-, macro-, and mega-pores based on a size, an abundance, or a combination thereof, of the pores. The method 300 may generate one or more plots identifying the secondary porosity and the matrix estimation. In a non-limiting example, the method 300 includes flagging secondary porosities within specific intervals of the one or more images to generate a secondary porosity flag plot. The method 300 also includes determining one or more volumetric estimates for the secondary porosities associated with each of the specific intervals indicated by the secondary porosity flag plot. The method 300 includes plotting the volumetric estimates for the matrix, the secondary porosities, or a combination thereof. For example, the method 300 may generate the secondary porosity flag plot 208 of FIG. 2, the secondary porosity quantification plot 210 of FIG. 2, the comparison plot 212 of FIG. 2, the matrix estimation plot 214 of FIG. 2, or a combination thereof.

In a non-limiting example, calibrating with log curves (312) includes using techniques as described herein with respect to FIG. 1 or 2, for example. Generating results (314), in a non-limiting example, includes generating an output of a three-dimensional (3D) geological model. In a non-limiting example, the method 300 includes storing the output to a computer-readable medium. The computer-readable medium may be the computer-readable medium 404 as described herein with respect to FIG. 4 or the computer-readable medium described herein with respect to FIG. 5, for example. In another non-limiting example, the method 300 includes transmitting the output to another system for rendering on a display device.

While, for purposes of simplicity of explanation, the method 300 of FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the method.

In some examples, the method 300 can generate an output (e.g., the output 200 of FIG. 2) characterizing the reservoir. The output can then be rendered on a display device (e.g., a display device as described with respect to FIG. 5), and thus enable a user (e.g., a technician) to visualize a result of the method 300. In some examples, the output can be stored in a computer-readable medium (e.g., a computer-readable medium 404 as described with respect to FIG. 4, or a memory as described with respect to FIG. 5). The computer-readable medium may be a computer-readable medium of the cloud, which enables remote access, for example.

The steps of the method 100, 300 may be executed by one or multiple computer applications. The steps of the method 100, 300 may be executed in any order, and in any combination, except where logic dictates otherwise, and may individually be executed one or more times. As a non-limiting example, 102 may be executed six (6) times followed by three (3) executions of 104, followed by executions of 106 one (1) time then executions of 108 two (2) times, 110 one (1) time, and 112 one (1) time. Executing a step multiple times may ensure an accuracy of data, a repeatability of a determination, or a combination thereof, thereby increasing an accuracy and reliability of outputs of the method 100, 300.

Figure 4:
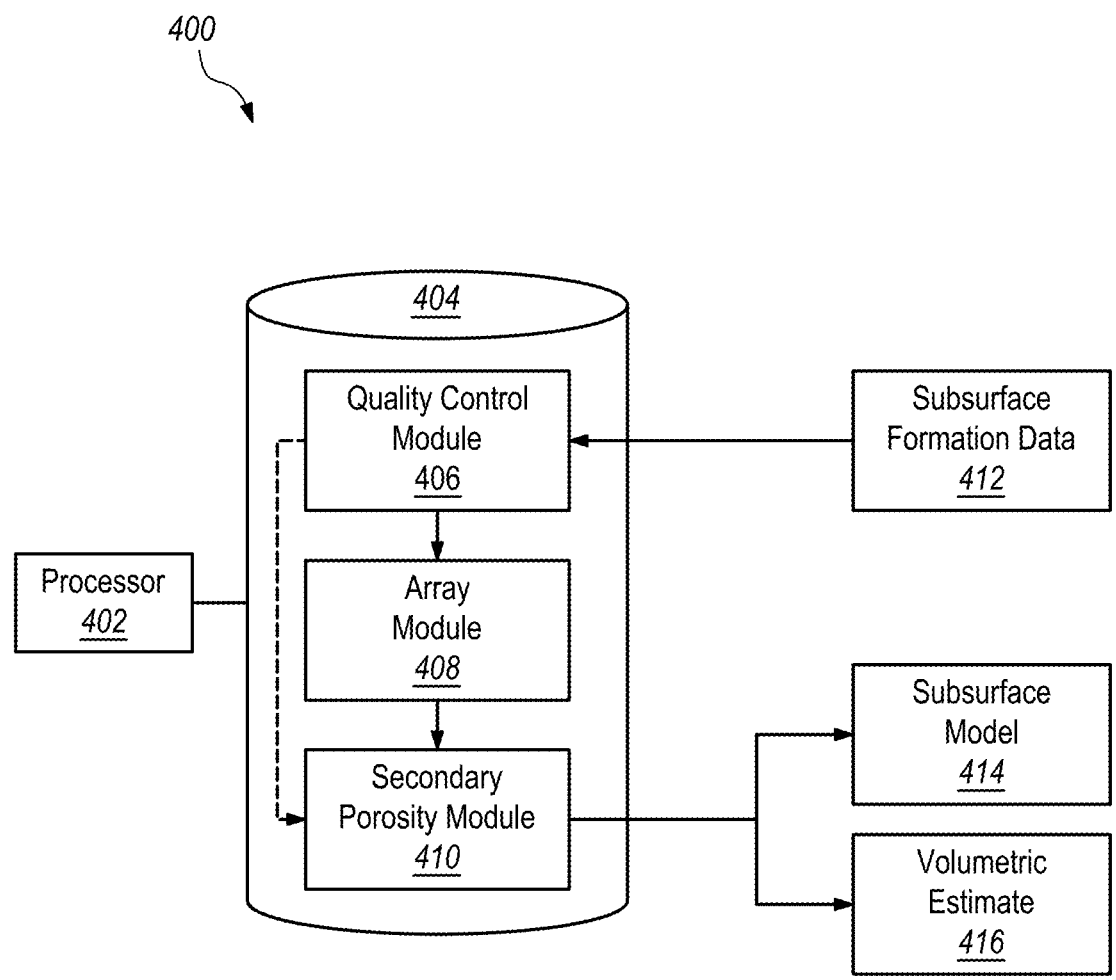
FIG. 4 is a system for identifying secondary porosities, in accordance with certain embodiments.

FIG. 4 is a system 400 for identifying secondary porosities, in accordance with certain embodiments. The system 400 performs the method 100 or the method 300 to generate the output 200, for example. Thus, reference can be made to the example of FIGS. 1-3 in the example of FIG. 4. The system includes a processor 402 coupled to a computer-readable medium 404 storing a quality control module 406, an array module 408, and a secondary porosity module 410. In a non-limiting example, the quality control module 406 receives subsurface formation data 412. The subsurface formation data 412 includes one or more core sample images, one or more borehole images, caliper enlargement data, bad-hole flag data, loss circulation data, traditional logging curves, or a combination thereof. An output of the quality control module 406 is input into the array module 408. An output of the array module 408 is input into the secondary porosity module 410. An output of the secondary porosity module 410 includes one or more of a subsurface model 414 and a volumetric estimate 416.

In a non-limiting example, receiving the subsurface formation data 412 may include receiving the data from an input device, retrieving the data from a computer-readable medium, or a combination thereof. The quality control module 406 receives the subsurface formation data 412 from a computer-readable medium of one or more logging tools, a computer-readable medium storing one or more sets of data remotely, or a combination thereof, for example. In a non-limiting example, the quality control module 406 receives different sets of the subsurface formation data 412 at different times and stores the different sets to the computer-readable medium 404. In response to receiving a request to identify secondary porosities, the quality control module 406 may then retrieve the multiple sets of subsurface formation data 412 from the computer-readable medium 404 for processing. In a non-limiting example, the quality control module 406 performs quality control on the data using techniques described herein with respect to FIG. 1, 2, or 3. Output of the quality control module 406 may include quality-controlled core sample images, quality-controlled borehole images, quality-controlled caliper enlargement data, quality-controlled bad-flag hole data, quality-controlled loss circulation data, or a combination thereof.

Figure 5:
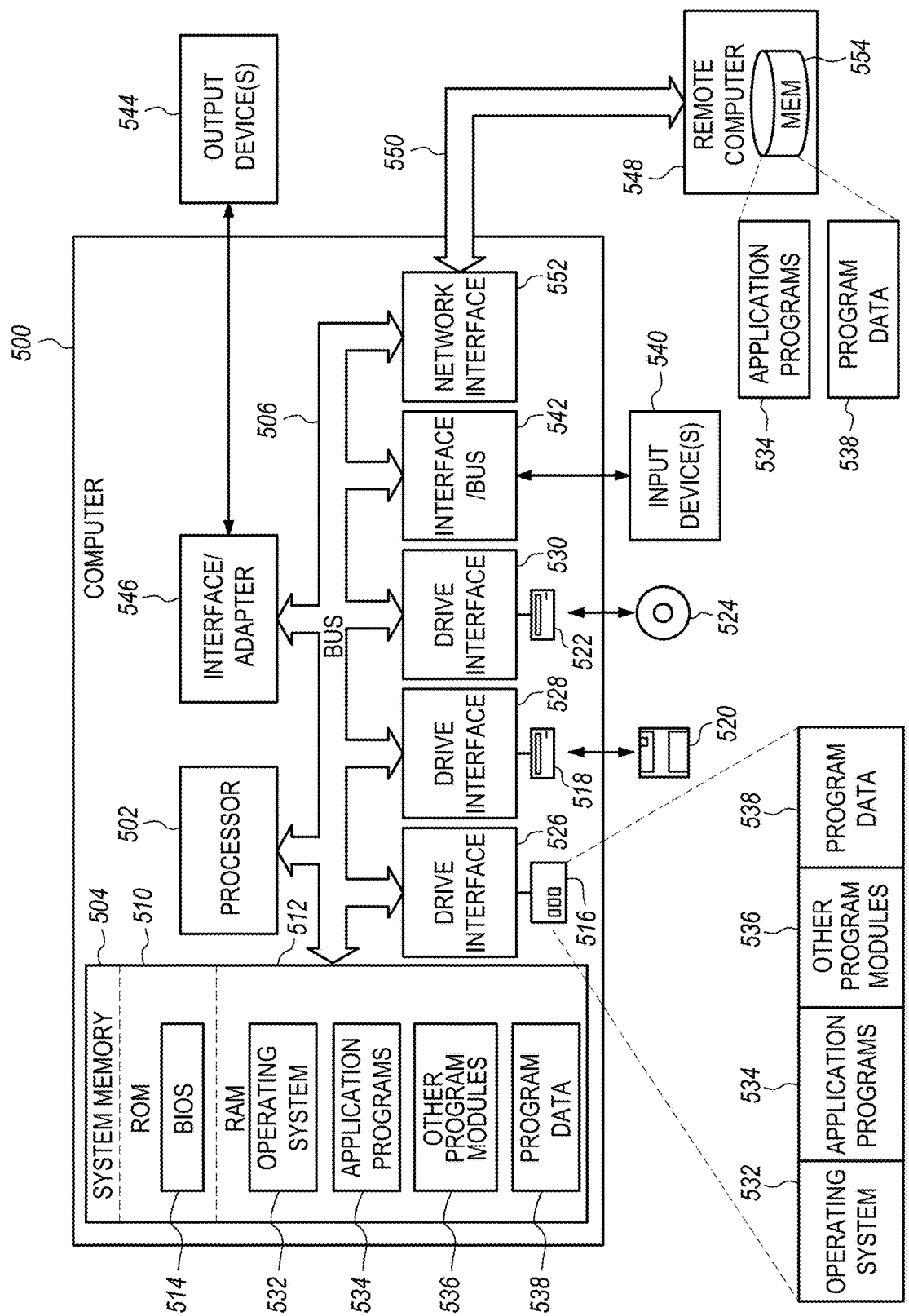
FIG. 5 is a block diagram of a computer system that can be employed to identify secondary porosities, in accordance with certain embodiments.

The array module 408 receives the quality-controlled data as an input, in a non-limiting example, and generates the image arrays using techniques described herein with respect to FIG. 1, 2, or 3. The secondary porosity module 410 receives the image arrays, quality-controlled images, the caliper enlargement data, the bad-flag hole data, and the loss circulation data and generates one or more of the subsurface model 414 or the volumetric estimate 416 using techniques described herein with respect to FIG. 1, 2, or 3. In a non-limiting example, the subsurface model 414 includes plots of the subsurface formation data 412. The subsurface model 414 includes one or more plots of the output 200, for example. In a non-limiting example, the secondary porosity module 410 can cause a display device (e.g., a display device, as shown in FIG. 5) to display the subsurface model 414, the volumetric estimate 416, or a combination thereof.

In some examples, the system 400 can generate an output characterizing the reservoir. The output characterizing the reservoir may be a 3D geographical model, for example. The output can then be rendered on a display device (e.g., a display device as described with respect to FIG. 5), and thus enable a user (e.g., a technician) to visualize a result of the system 400. In some examples, the output can be stored to the computer-readable medium 404 or to a remote computer-readable medium as described with respect to FIG. 5, for example.

The methods (e.g., the method 100, the method 300) and systems (e.g., the system 400) described herein may be used to identify and quantify both interconnected and non-interconnected (e.g., isolated) secondary porosities within a subterranean formation. Identification of the secondary porosities improves modeling of fluid flow patterns in reservoirs having voids, regardless of the shape, size, orientation, or a combination thereof, of the secondary porosities.

In view of the foregoing structural and functional description, those skilled in the art will appreciate that portions of the embodiments described herein may be implemented as a method, data processing system, or computer program product (e.g., computer application). Accordingly, these portions of the present disclosure may take the form of an entirely hardware embodiment, an entirely software embodiment, or an embodiment combining software and hardware, such as shown and described with respect to the computer system of FIG. 5. Furthermore, portions of the embodiments herein may be a computer program product on a computer-readable medium having computer-readable program code on the medium. Any suitable non-transitory computer-readable medium may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage medium may include a semiconductor-based circuit or device or other integrated circuit (IC) (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments described herein have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks. These computer-executable instructions may also be stored in a computer-readable medium that can direct a computer or other programmable data processing apparatus to function in a particular manner, such that the instructions stored in the computer-readable medium result in an article of manufacture including instructions which implement the function specified in the flowchart block or blocks. The computer-executable instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

FIG. 5 is a block diagram of a computer system 500 that can be employed to execute a system for determining penetration gradients in accordance with certain embodiments described. The computer system 500 may be the computer system used to implement at least part of the method 100 of FIG. 1 or the method 300 of FIG. 3, for example. Computer system 500 can be implemented on one or more general purpose networked computer systems, embedded computer systems, routers, switches, server devices, client devices, various intermediate devices/nodes or standalone computer systems. Additionally, computer system 500 can be implemented on various mobile clients such as, for example, a personal digital assistant (PDA), laptop computer, pager, and the like, provided it includes sufficient processing capabilities.

Computer system 500 includes processing unit 502, system memory 504, and system bus 506 that couples various system components, including the system memory 504, to processing unit 502. Dual microprocessors and other multi-processor architectures also can be used as processing unit 502. System bus 506 may be any of several types of bus structure including a memory bus or memory controller, a peripheral bus, and a local bus using any of a variety of bus architectures. System memory 504 includes read only memory (ROM) 510 and random access memory (RAM) 512. A basic input/output system (BIOS) 514 can reside in ROM 510 containing the basic routines that help to transfer information among elements within computer system 500.

Computer system 500 can include a hard disk drive 516, magnetic disk drive 518, e.g., to read from or write to removable disk 520, and an optical disk drive 522, e.g., for reading CD-ROM disk 524 or to read from or write to other optical media. Hard disk drive 516, magnetic disk drive 518, and optical disk drive 522 are connected to system bus 506 by a hard disk drive interface 526, a magnetic disk drive interface 528, and an optical drive interface 530, respectively. The drives and associated computer-readable medium provide nonvolatile storage of data, data structures, and computer-executable instructions for computer system 500. Although the description of computer-readable medium above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 512, including operating system 532, one or more computer application programs 534, other program modules 536, and program data 538. In some examples, the computer application programs 534 can include one or more sets of computer-executable instructions associated with one or more functions and methods programmed to perform the method 100 of FIG. 1 or the method 300 of FIG. 3 to identify secondary porosities and the program data 538 can include the output 200 of FIG. 2. For example, the computer applications programs 534 can include the quality control module 406, the image array module 408, and the secondary porosity module 410 and the program data 538 can include the subsurface formation data 412, the subsurface model 414, and the volumetric estimate 416.

A user may enter commands and information into computer system 500 through one or more input devices 550, such as a pointing device (e.g., a mouse, touch screen), keyboard, microphone, joystick, game pad, scanner, and the like. The user can employ input device 550 to edit or modify the data used by the method 100 of FIG. 1 or the method 300 of FIG. 3, the output 200 of FIG. 2, or the subsurface formation data 412, the subsurface model 414, or the volumetric estimate 416 of FIG. 4, for example. For example, the user can employ input device 550 to insert comments for different regions of the output 200 or the subsurface model 414. These and other input devices 550 are often connected to processing unit 502 through a corresponding port interface 552 that is coupled to the system bus, but may be connected by other interfaces, such as a parallel port, serial port, or universal serial bus (USB). One or more output devices 544 (e.g., display, a monitor, printer, projector, or other type of displaying device) is also connected to system bus 506 via interface 556, such as a video adapter.

Computer system 500 may operate in a networked environment using logical connections to one or more remote computers, such as remote computer 548. Remote computer 548 may be a workstation, computer system, router, peer device, or other common network node, and typically includes many or all the elements described relative to computer system 500. The logical connections, schematically indicated at 550, can include a local area network (LAN) and a wide area network (WAN). When used in a LAN networking environment, computer system 500 can be connected to the local network through a network interface or adapter 552. When used in a WAN networking environment, computer system 500 can include a modem, or can be connected to a communications server on the LAN. The modem, which may be internal or external, can be connected to system bus 506 via an appropriate port interface. In a networked environment, computer application programs 534 or program data 538 depicted relative to computer system 500, or portions thereof, may be stored in a remote memory storage device 554.

Embodiments disclosed herein include:

A. A method for identifying secondary porosities, the method including: correlating multiple sets of data of a subsurface formation, where the multiple sets of data are selected from one or more of core sample images, borehole images, caliper enlargement data, bad-hole flag data, and loss circulation data; identifying one or more secondary porosities based on the correlated data; and determining a volumetric estimation of the subsurface formation based on the one or more secondary porosities.

B. A non-transitory computer-readable medium storing machine-readable instructions, which, when executed by a processor, cause the processor to: determine that images associated with a subsurface formation pass quality control; correlate multiple sets of data of the subsurface formation with the quality-controlled images, where the multiple sets of data are selected from one or more of caliper enlargement data, bad-hole flag data, and loss circulation data; identify one or more secondary porosities based on the data; and determine a volumetric estimation of the subsurface formation based on the one or more secondary porosities.

C. A system including: a quality control module, implemented by at least one processor, to determine whether images enable a secondary porosity analysis of a subsurface formation; and a secondary porosity module, implemented by the at least one processor, to determine a volumetric estimate of the subsurface formation based on the quality-controlled images and multiple sets of data selected from one or more of caliper enlargement data, bad-hole flag data, and loss circulation data.

Each of embodiments A through C may have one or more of the following additional elements in any combination: Element 1: analyzing a quality of the core sample images, the borehole images, or a combination thereof; and notifying a user to provide one or more respective replacement images in response to the quality of the core sample images, the borehole images, or the combination thereof being below a threshold level; Element 2: receiving the one or more respective replacement images; analyzing the quality of the one or more respective replacement images; and determining a baseline to use for correlating the multiple sets of data and the one or more respective replacement images; Element 3: generating one or more image arrays based on the core sample images; and generating at least one of a secondary porosity plot or a matrix estimation plot based on one or more image arrays; Element 4: identifying, using a count pointing technique, one or more segments of the one or more image arrays that include one or more secondary porosities; flagging the one or more segments as secondary porosities; and generating the at least one of the secondary porosity plot or the matrix estimation plot based on the one or more image arrays and the flagging; Element 5: determining one or more segments of at least one of the caliper enlargement data, the bad-hole flag data, or the loss circulation data indicate human activity induced a caliper enlargement, a bad-hole, or a loss circulation, respectively; flagging the one or more segments as indicating a human activity; and calibrating the secondary porosity plot, the matrix estimation plot, or the combination thereof, based on the flagging indicating the human activity; Element 6: calibrating the secondary porosity plot, the matrix estimation plot, or a combination thereof, using log curves; and generating an output including the calibration; Element 7: where the log curves are generated using measurements of computed tomography (CT) scans of one or more core samples; Element 8: where the images include core sample images and borehole images, and where the processor is operable to: notify a user to provide one or more respective replacement images in response to the quality of the core sample images, the borehole images, or the combination thereof, being below a threshold level; and replace the core sample images, the borehole images, or the combination thereof, with the one or more respective replacement images; Element 9: where the processor is operable to: determine a baseline to use for correlating the core sample images, the borehole images, and the multiple sets of data of the subsurface formation; Element 10: where the processor is operable to: generate one or more image arrays based on the core sample images; and generate at least one of a secondary porosity plot or a matrix estimation plot based on the one or more image arrays, the borehole images, and the multiple sets of data of the subsurface formation; Element 11: calibrate the secondary porosity plot, the matrix estimation plot, or a combination thereof, using log curves; and generate an output including the calibration; Element 12: where the images include one or more core sample images and one or more borehole images; Element 13: where the secondary porosity module is configured to cause the processor to: determine a baseline to use for correlating the one or more core sample images, the one or more borehole images, and the multiple sets of data; Element 14: where an image array module is configured to cause the processor to generate one or more image arrays based on the one or more core sample images, the one or more borehole images, or a combination thereof, and where the secondary porosity module is configured to cause the processor to generate at least one of a secondary porosity plot or a matrix estimation plot based on one or more image arrays and the multiple sets of data; Element 15: where the secondary porosity module is configured to cause the processor to: calibrate the secondary porosity plot, the matrix estimation plot, or a combination thereof, using log curves; determine an interval based on a type of logging tool used to generate the one or more borehole images; and determine the volumetric estimate of the subsurface formation using the interval; Element 16: where the log curves include at least one of the multiple sets of data, one or more computed tomography (CT) scans, or a combination thereof; and Element 17: where the secondary porosity module is configured to cause the processor to: generate one or more plots selected from the quality-controlled images, the caliper enlargement data, the bad-hole flag data, the loss circulation data, the one or more image arrays, the secondary porosity plot, the matrix estimation plot, and the volumetric estimate.

By way of non-limiting example, exemplary combinations applicable to A through C include: Element 1 with Element 2; Element 3 with Element 4; Element 3 with Element 5; Element 3 with Element 6; Element 3 with Element 7; Element 4 with Element 5; Element 4 with Element 6; Element 4 with Element 7; Element 5 with Element 6; Element 5 with Element 7; Element 6 with Element 7; Element 8 with Element 9; Element 8 with Element 10; Element 8 with Element 11; Element 9 with Element 10; Element 9 with Element 11; Element 10 with Element 11; Element 12 with Element 13; Element 12 with Element 14; Element 12 with Element 15; Element 12 with Element 16; Element 12 with Element 17; Element 13 with Element 14; Element 13 with Element 15; Element 13 with Element 16; Element 13 with Element 17; Element 14 with Element 15; Element 14 with Element 16; Element 14 with Element 17; Element 15 with Element 16; Element 15 with Element 17; and Element 16 with Element 17.

The terminology used herein is for the purpose of describing particular embodiments only and is not intended to limit this disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. Also, the phraseology and terminology used herein is for the purpose of description and should not be regarded as limiting. The use of "including," "comprising," "having," "containing," "involving," and variations thereof herein, is meant to encompass items listed thereafter and equivalents thereof as well as additional items. While the disclosure has described several exemplary embodiments, it will be understood by those skilled in the art that various changes can be made, and equivalents can be substituted for elements thereof, without departing from the spirit and scope of the invention.

In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

The invention claimed is:

1. A method for identifying secondary porosities, the method comprising:
   correlating multiple sets of data of a subsurface formation, wherein the multiple sets of data are selected from one or more of core sample images, borehole images, caliper enlargement data, bad-hole flag data, and loss circulation data;
   identifying one or more secondary porosities based on the correlated data;
   determining a volumetric estimation of the subsurface formation based on the one or more secondary porosities;
   analyzing a quality of the core sample images, the borehole images, or a combination thereof;
   notifying a user to provide one or more respective replacement images in response to the quality of the core sample images, the borehole images, or the combination thereof being below a threshold level;
   outputting a plurality of plots characterizing the subsurface formation, the plurality of plots being based on the correlated data and the one or more secondary porosities; and
   displaying the output plurality of plots on a display device.

2. The method of claim 1, further comprising:
   receiving the one or more respective replacement images;
   analyzing the quality of the one or more respective replacement images; and
   determining a baseline to use for correlating the multiple sets of data and the one or more respective replacement images.

3. The method of claim 1, further comprising:
   outputting one or more image arrays based on the core sample images; and
   outputting at least one of a secondary porosity plot or a matrix estimation plot based on one or more image arrays.

4. The method of claim 3, further comprising:
   identifying, using a count pointing technique, one or more segments of the one or more image arrays that include one or more secondary porosities; and
   flagging the one or more segments as secondary porosities;
   wherein the at least one of the secondary porosity plot or the matrix estimation plot is based on the one or more image arrays and the flagging.

5. The method of claim 4, further comprising:
   determining one or more segments of at least one of the caliper enlargement data, the bad-hole flag data, or the loss circulation data indicate human activity induced a caliper enlargement, a bad-hole, or a loss circulation, respectively;
   flagging the one or more segments as indicating a human activity; and
   calibrating the secondary porosity plot, the matrix estimation plot, or the combination thereof, based on the flagging indicating the human activity.

6. The method of claim 5, further comprising:
   calibrating the secondary porosity plot, the matrix estimation plot, or a combination thereof, using log curves; and
   wherein the output includes the calibration.

7. The method of claim 6, wherein the log curves are based on measurements of computed tomography (CT) scans of one or more core samples.

8. A non-transitory computer-readable medium storing machine-readable instructions, which, when executed by a processor, cause the processor to:
   determine that images associated with a subsurface formation pass quality control;
   correlate multiple sets of data of the subsurface formation with the quality-controlled images, wherein the multiple sets of data are selected from one or more of caliper enlargement data, bad-hole flag data, and loss circulation data;
   identify one or more secondary porosities based on the data;
   determine a volumetric estimation of the subsurface formation based on the one or more secondary porosities;
   wherein the images includes core sample images and borehole images, and wherein the processor is operable to:

notify a user to provide one or more respective replacement images in response to a quality of the core sample images, the borehole images, or the combination thereof, being below a threshold level; and replace the core sample images, the borehole images, or the combination thereof, with the one or more respective replacement images; and output a plurality of plots, characterizing the subsurface formation, wherein the plurality of plots are based on the data and the one or more secondary porosities; and display the plurality of plots on a display device.

9. The non-transitory computer-readable medium of claim 8, wherein the processor is operable to:

determine a baseline to use for correlating the core sample images, the borehole images, and the multiple sets of data of the subsurface formation.

10. The non-transitory computer-readable medium of claim 9, wherein the processor is operable to:

output one or more image arrays based on the core sample images; and output at least one of a secondary porosity plot or a matrix estimation plot based on the one or more image arrays, the borehole images, and the multiple sets of data of the subsurface formation.

11. The non-transitory computer-readable medium of claim 10, wherein the processor is operable to:

calibrate the secondary porosity plot, the matrix estimation plot, or a combination thereof, using log curves; and wherein the output includes the calibration.

12. A system comprising:

a quality control module, implemented by at least one processor, to determine whether images enable a secondary porosity analysis of a subsurface formation and notify a user to provide one or more respective replacement images in response to a quality of the images is below a threshold level for enabling the secondary porosity analysis of the subsurface formation;

a secondary porosity module, implemented by the at least one processor, to determine a volumetric estimate of the subsurface formation based on the quality-controlled images and multiple sets of data selected from one or more of caliper enlargement data, bad-hole flag data, and loss circulation data; and a display device to display an output generated by the at least one processor, wherein the output comprises a plurality of plots and images based on one or more identified secondary porosities and the quality-controlled images and multiple sets of data.

13. The system of claim 12, wherein the images include one or more core sample images and one or more borehole images.

14. The system of claim 13, wherein the secondary porosity module is configured to cause the processor to:

determine a baseline to use for correlating the one or more core sample images, the one or more borehole images, and the multiple sets of data.

15. The system of claim 14, wherein an image array module is configured to cause the processor to output one or more image arrays based on the one or more core sample images, the one or more borehole images, or a combination thereof, and wherein the secondary porosity module is configured to cause the processor to output at least one of a secondary porosity plot or a matrix estimation plot based on one or more image arrays and the multiple sets of data.

16. The system of claim 15, wherein the secondary porosity module is configured to cause the processor to:

calibrate the secondary porosity plot, the matrix estimation plot, or a combination thereof, using log curves;

determine an interval based on a type of logging tool used to generate the one or more borehole images; and determine the volumetric estimate of the subsurface formation using the interval.

17. The system of claim 16, wherein the log curves include at least one of the multiple sets of data, one or more computed tomography (CT) scans, or a combination thereof.

18. The system of claim 17, wherein the secondary porosity module is configured to cause the processor to:

output one or more plots selected from the quality-controlled images, the caliper enlargement data, the bad-hole flag data, the loss circulation data, the one or more image arrays, the secondary porosity plot, the matrix estimation plot, and the volumetric estimate.

* * * * *